July 7, 1925.  
F. F. HOBSON  
LINE CHALKER  
Filed July 17, 1924
1,545,327
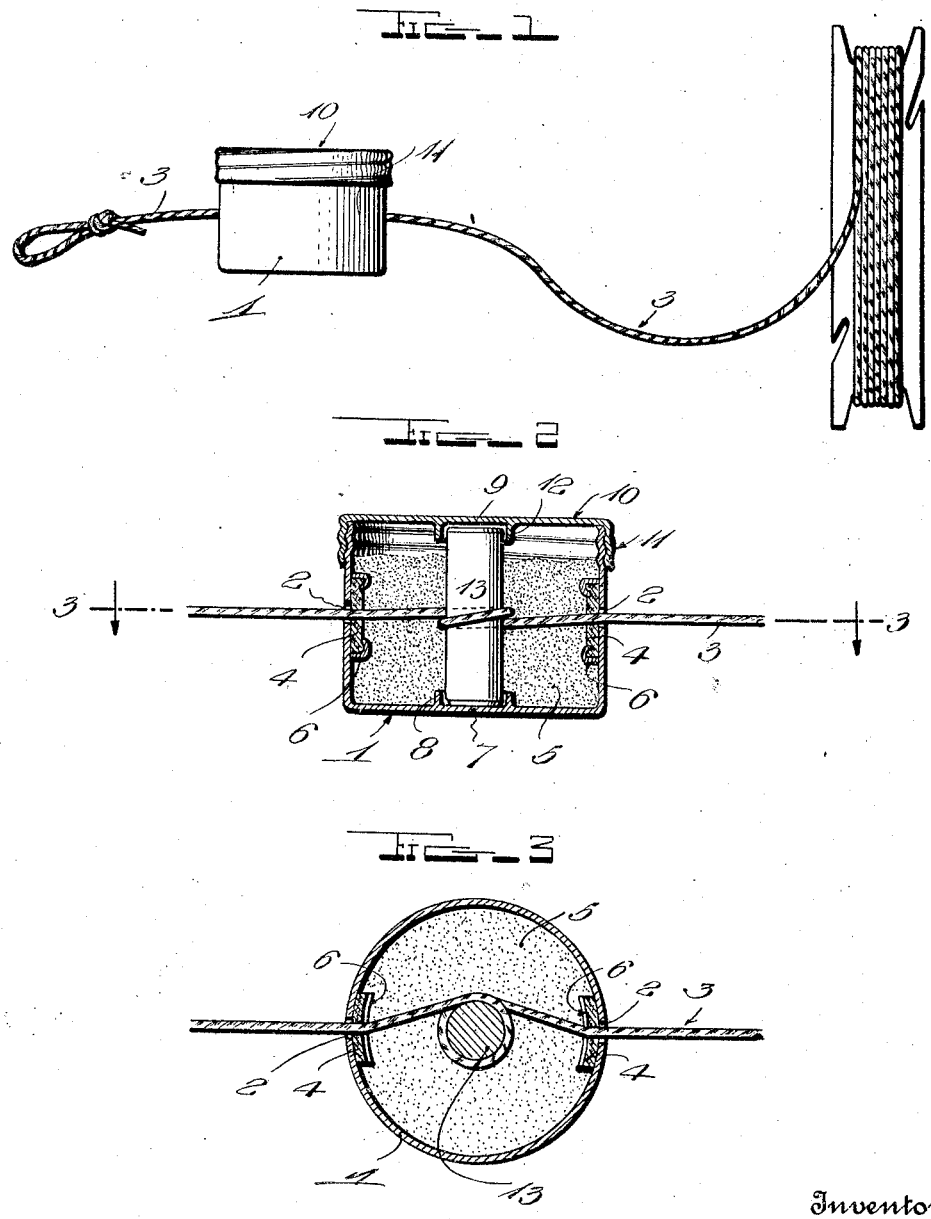
Inventor  
Francis F. Hobson Patented July 7, 1925.

1,545,327

UNITED STATES PATENT OFFICE.

FRANCIS F. HOBSON, OF LOS ANGELES, CALIFORNIA.

LINE CHALKER.

Application filed July 17, 1924. Serial No. 726,572.

*To all whom it may concern:*

Be it known that I, FRANCIS F. HOBSON, a citizen of the United States, residing at Los Angeles, in the county of Los Angeles and State of California, have invented certain new and useful Improvements in Line Chalkers; and I do declare the following to be a full, clear, and exact description of the invention, such as will enable others skilled in the art to which it appertains to make and use the same.

My invention relates to improvements in devices for applying chalk to chalk lines, such as those commonly used by carpenters, and while I am aware that numerous devices have heretofore been designed for applying powdered chalk to lines, it is the object of my invention to provide a device of this class which is of extremely simple and inexpensive nature, yet is highly efficient, reliable and easily used.

With the foregoing in view, the invention resides in the novel subject matter hereinafter described and claimed, the description being supplemented by the accompanying drawing.

Figure 1 is a side elevation showing the application of my invention to a chalk line.

Figure 2 is an enlarged vertical sectional view.

Figure 3 is a horizontal section on line 3—3 of Fig. 2.

In the drawing above briefly described, the numeral 1 designates a circular, cup-shaped casing having openings 2 in its side wall, through which a chalk line 3 may be passed, perforated packing washers 4 being preferably secured to the inner side of the casing wall to tightly engage the line and prevent sifting of the powdered chalk 5, through the openings 2. In securing these washers 4 in place, horizontal flanges 6 are preferably secured to the walls of the casing at the upper and lower edges of the washers, and the inner edges of said flanges are clinched inwardly upon the inner sides of the washers, as shown.

The bottom of the casing 1 is provided with an upwardly opening bearing socket 7 which is by preference formed by extending an annular flange 8 upwardly from said bottom. This socket is alined with a downwardly opening socket 9 carried by a removable cover 10 with which the casing 1 is provided, said cover preferably having an annular flange 11 threaded upon the casing, as shown in Figs. 1 and 2. Like the socket 7, the socket 9 is preferably formed by an annular flange 12 which extends inwardly from the removable cover 10.

The two sockets 7 and 9 rotatably receive the ends of a short shaft 13 around which the line 3 is wound one or more times, as clearly illustrated in Figs. 2 and 3. When the line is pulled through the casing or the casing is slid along the line, the shaft 13 rotates and effectively stirs the chalk dust 5 in said casing, so that some of this dust is deposited upon the line 3, permitting the latter to be used in marking a straight line, when it is stretched and snapped in the usual manner.

It will be seen that the device is extremely simple and inexpensive, and may be easily and advantageously operated. On account of the advantages derived from the details disclosed, they may well be followed, but within the scope of the invention as claimed, minor changes may of course be made.

I claim:

A line chalker comprising a cup-shaped chalk powder casing having an upwardly opening bearing socket at its bottom and a pair of line receiving openings in its side wall, a removable cover closing the upper end of said casing and having a downwardly opening bearing socket alined with the aforesaid socket, and a short shaft in the casing around which the line is to be wound, said shaft having its ends rotatably received in the aforesaid sockets.

In testimony whereof I have hereunto affixed my signature.

FRANCIS F. HOBSON.